3,536,474
METHOD FOR SELECTIVELY REGULATING THE GROWTH OF PLANTS
Linus Marvin Ellis, 1 Sunnyside Road, West Farm, Greenville, Wilmington, Del. 19807, and James Edwin Harrod, Sharpless Road, Hockessin, Del. 19707
No Drawing. Filed June 23, 1967, Ser. No. 648,252
Int. Cl. A01n 9/22
U.S. Cl. 71—92                                      17 Claims

ABSTRACT OF THE DISCLOSURE

Selectively regulating the growth of plants with 2,3,4,5-tetrahydro-[6H]-1,2,4-oxadiazine-3,5-diones of the formula:

(I)

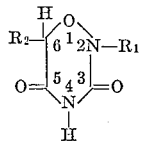

wherein $R_1$ is hydrogen, lower alkyl or phenyl and $R_2$ is hydrogen or methyl.

SUMMARY OF THE INVENTION

In summary, this invention relates to a method of selectively regulating the growth of plants. More specifically, it refers to a method of selectively regulating the growth of plants comprising applying to the locus of growth of said plants an effective amount of a 2,3,4,5-tetrahydro-[6H]-1,2,4-oxadiazine-3,5-dione of the formula (II)

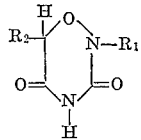

wherein $R_1$ is hydrogen, alkyl of 1 through 6 carbon atoms or phenyl, and $R_2$ is hydrogen or methyl.

Those compounds of Formula II wherein $R_1$ is hydrogen or alkyl of 1 through 3 carbon atoms and $R_2$ is methyl are preferred for use in the methods of this invention.

Compounds of Formula II form salts with cations such as sodium, potassium, lithium, calcium, magnesium, barium, strontium, iron, manganese and quaternary ammonium. These compounds also combine with nitrogenous bases having ionization constants $\geq 10^{-9}$ in water to form salts, addition compounds or complexes depending on the identity of the base. These salts, addition compounds and complexes are also useful for the regulation of plant growth and function in the same manner as do the parent compounds. Moreover, by proper selection of the cation or nitrogenous base the physical properties such as solubility, volatility and crystallinity of the parent compound can be influenced so as to yield a more useful product.

Suitable nitrogenous bases include substituted, unsubstituted, cyclic and acyclic amines, amidines and guanidines. The amines can be primary, secondary or tertiary amines, polyamines, arylamines or heterocyclicamines. Illustrative of such nitrogenous bases are sec.-butylamine, 2-amino-2-methyl - 1,3 - propanediol, trimethylenediamine, ethanolamine, dodecylamine, ethylenediamine, hexamethylenediamine, cocoadiamine, tallowdiamine, hexamethyleneimine, cyclohexylamine, methoxypropylamine, methylamine, dimethylamine, trimethylamine, ammonia, ethylamine, propylamine, butylamine, octylamine, pyridine, piperidine, tetramethylguanidine, acetamidine, benzylamine, diethylenediamine, 2-aminobutanol-1 and 2-amino-octanol-1.

DETAILED DESCRIPTION OF THE INVENTION

Plant growth regulation

A variety of beneficial results can be obtained through the regulation of plant growth by application of compounds of Formula II to the locus of plant growth. By "locus of plant growth" is meant the plant itself or the soil in which the plant is growing or in which growth of the plant is anticipated.

With respect to one particularly unique aspect of plant growth regulation, it has been found that when a compound of Formula II is applied to sugar-containing plants at the proper time during their growth, a surprising increase in the sugar content of the plant can be obtained. For sugar cane and sorghum, which are grown for sucrose production, this increase in sugar content is observed directly as an increase in the yield from a given area of cropland. With other plants such as apples, oranges, pears, cherries and grapes the increase is observed by analysis of the plant or by analysis of the harvested parts thereof. Obviously, increased sugar levels improve the palatability of the plant or plant parts and offer improved dietary value. While the mechanism involved in this increase in sugar content is not fully understood, it is apparent that the compounds used in this invention redirect the carbohydrate metabolism of the plant in such a way as to increase the sugar level in the plant juices.

When compounds of Formula II are utilized to obtain an increase in the sugar content of plants, application is preferably carried out at from about 10 to about 60 days prior to the normally scheduled harvest of the plants or plant parts, from about 20 to about 40 days being the most preferred interval between treatment and harvest.

Application of a compound of Formula II to sugar-containing crops at rates of from about 0.1 to about 20 kilograms per hectare will usually result in a substantial increase of the sugar content of the treated plants, the preferred rate being from about 0.25 to about 10 kilograms per hectare.

Compounds of Formula II can also be effectively utilized to retard the growth of a variety of plants. For example, when application is made to bluegrass, crabgrass or Black Valentine beans at rates of from about 0.5 to about 20 kilograms per hectare, the rate of growth of the treated plant is substantially reduced.

Regulation of the inflorescence of various plants can also be obtained by applying to the plant a compound of Formula II. For example, inflorescence of tobacco can be prevented or reduced by application of from about 0.1 to about 10 kilograms per hectare.

In yet another aspect of plant growth regulation, compounds of Formula I exhibit marked utility as herbicides. For example, pre-emergent application at rates of from about 0.25 to about 20 kilograms per hectare controls weeds such as ryegrass, crabgrass, barnyard and pigweed. Foliar spray application at these rates also provides excellent control of established crabgrass, barnyard grass and pigweed.

While suitable application rates for various purposes have been provided above, it will be appreciated that the amount of a compound of Formula I that will be effective to provide the desired type and degree of growth regulation will vary, for example, with the particular crop or weeds involved, plant density, the application method, prevailing weather conditions and the particular active ingredient used. Since many factors are involved, it is not possible to indicate generally one rate of application suitable for all situations. However, effective resolution of these factors in determining the effective growth regula-

Preparation

Compounds of Formula II can be prepared by cyclizing a ureidoxy compound of the formula:

(III) 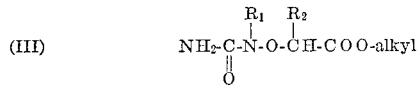

wherein $R_1$ and $R_2$ are as defined above by treatment with an alkali metal alkoxide such as sodium methoxide in an alcohol such as methanol. The details of this preparative technique and details regarding the preparation of compounds of Formula III are set forth in U.S. Pat. 3,238,200.

The salts, addition compounds and complexes referred to above are conveniently prepared by combining a compound of Formula II with an equivalent amount of quaternary ammonium hydroxide, appropriate metal hydroxide or appropriate nitrogenous base in water or suitable organic solvent. Stripping the free water or the organic solvent from the solution yields the desired product in high yield.

Compositions

Compositions used in the methods of this invention can be prepared by admixing at least one of the compounds of Formula I with adjuvants or modifiers to provide compositions such as dusts, solutions, water soluble and dispersible powders, aqueous dispersions or emulsions, granules and high-strength compositions.

Thus, the compounds can be used with a carrier or diluent agent such as a finely divided solid, a solvent liquid of organic origin, water, a wetting agent, a dispersing agent, an emulsifying agent, an aqueous emulsion or any suitable combination of these.

Compositions used in the methods of this invention, especially liquids and wettable powders, can contain as a conditioning agent one or more surface-active agents in amounts sufficient to render a given composition readily dispersible in water or in oil. By the term "surface-active agent," it is understood that wetting agents, dispersing agents, suspending agents and emulsifying agents are included.

Suitable surface-active agents are set forth, for example, in Searle, U.S. Pat. 2,426,417; Todd, U.S. Pat. 2,655,447; Jones, U.S. Pat. 2,412,510 or Lenher, U.S. Pat. 2,139,276. A detailed list of such agents is also set forth in "Detergents and Emulsifiers 1966 Annual" by John W. McCutcheon, Inc. In general, less than ten percent by weight of the surface-active agent is present in the compositions used in this invention, although the amount of surface-active agent in these compositions is usually less than two percent by weight. However, levels as high as five parts of surfactant for each part of active compound give unusual and unexpected beneficial results. Such compositions have a greater activity than can be expected from a consideration of the activity of the components used separately.

Wettable powders are water-dispersible compositions containing the active material, an inert solid extender, and one or more surfactants to provide rapid wetting and to prevent heavy flocculation when suspended in water. The inert extenders which should be used in the preferred wettable powders of this invention are preferably of mineral origin and the surfactants are preferably anionic or non-ionic.

Suitable surfactants for use in such compositions are listed by John W. McCutcheon in "Detergents and Emulsifiers, 1966 Annual" already mentioned above. The classes of extenders most suitable for the wettable powder formulations utilized in the methods of this invention are the natural clays, diatomaceous earth, and synethic mineral fillers derived from silica and silicate. Among non-ionic and anionic surfactants, those most suitable for the preparation of the day, wettable products used in this invention are solid forms of compounds known to the art as wetters and dispersants. Occasionally a liquid, nonionic compound classified primarily as an emulsifier may serve as both wetter and dispersant, but such types are usually avoided because of the difficulty in obtaining homogenous distribution through the solid mass.

Most preferred fillers for use in wettable powders are kaolinites, bentonitic clays, attapulgite clay and synthetic fine silica or magnesium silicate. Preferred wetting agents are alkylbenzene and alkylnaphthalene sulfonates, sulfonates, sulfated fatty alcohols, ethoxylated amines, alkanolamides, long chain acid esters of sodium isethionate, esters of sodium sulfosuccinate, sulfated or sulfonated fatty acid esters, petroleum sulfonates, sulfonated vegetable oils and ditertiary acetylenic glycols. Preferred dispersants are methyl cellulose, polyvinyl alcohol, sodium lignin sulfonates, polyvinylpyrrolidone derivatives, polymeris alkyl naphthalene sulfonates, sodium naphthalene sulfonate, polymethylene bis-naphthalenesulfonate and sodium-N-methyl-N-(long chain acid) taurates.

Wetting and dispersing agents in these preferred wettable powder compositions used in this invention are usually present at concentrations of from about 0.5 weight percent to 5 weight percent. The inert extender then completes the formulation. Where needed, a portion of the extender may be replaced by a corrosion inhibitor or an anti-foaming agent, or both.

Thus, wettable powder formulations used in this invention will contain from about 25 to about 90 weight percent active material, from 0.5 to 3.0 weight percent wetting agent, from 0.25 to 5.0 weight percent dispersant, and from 2.0 to 74.25 weight percent inert extender as these terms are described above.

When the wettable powder contains a corrosion inhibitor or an anti-foaming agent or both, the corrosion inhibitor will not exceed about one weight percent of the composition and the anti-foaming agent will not exceed about one weight percent of the composition, both replacing equivalent amounts of the inert extender.

Aqueous suspensions are prepared by mixing together and sand-grinding an aqueous slurry of water-insoluble active ingredient in the presence of dispersing agents to obtain a concentrated slurry of very finely divided particles in which the active ingredient is substantially all less than five microns in size. The resulting concentrated aqueous suspension is characterized by its extremely small particle size, so that when diluted and sprayed coverage is very uniform. Aqueous suspensions will usually contain from 10 to 55% by weight of one or more active ingredients.

Water dispersible powders are prepared from the water soluble compounds used in the methods of this invention. In certain cases the compound itself is dissolved in water without any other additive present and the resultant aqueous solution is sprayed on the locus to be treated. In other cases finely divided inert solid extenders and surfactants are blended with the active ingredient. Upon extension with water, the active component first disperses and then dissolves, leaving the inert solid in suspension to act as a tracer.

Dusts are dense powder compositions which are intended for application in dry form. Dusts are characterized by their free-flowing and rapid settling properties so that they are not readily windborne to areas where their presence is not desired. They contain primarily an active material and a dense, free-flowing extender. Their performance is sometimes aided by the inclusion of a wetting agent, and convenience in manufacture frequently demands the inclusion of an inert, absorptive griding aid. For the compounds used in this invention, the inert extender may be of either vegetable or mineral origin, the wetting agent is preferably anionic or non-ionic and suitable adsorptive grinding aids are of mineral origin.

Suitable classes of inert solid extenders for use here are primarily those organic or inorganic powders which possess high bulk density and are very free-flowing. They also frequently possess relatively low surface areas and are poor in liquid absorption. Suitable classes of grinding aids are some natural clays, diatomaceous earths, synthetic mineral fillers derived from silica or silicates and other extenders useful in the preparation of wettable powders. Among ionic and non-ionic wetting agents, the most suitable are the members of the group known to the art as wetting agents and emulsifiers. Although solid agents are preferred because of ease of incorporation, some liquid non-ionic agents are also suitable in this invention.

Preferred inert solid extenders for the dusts of this invention are micaceous talcs, pyrophyllite, dense kaolin clays, calcium carbonates, tobacco dust and ground calcium phosphate rock such as that known as "Phosphodust" (a trademark of the American Agricultural Chemical Company).

Preferred grinding aids are attapulgite clay, diatomaceous silica, synthetic fine silica and synthetic calcium and magnesium silicates. Preferred wetting agents are those previously listed under wettable powder formulations.

The inert solid extenders in the dusts used in this invention are usually present in concentrations of from about 30 to 90 weight percent of the total composition. The grinding aid will usually constitute 0 to 50 weight percent of the composition and the wetting agent will constitute from about 0 to 1.0 weight percent of the composition. Dust compositions can also contain other surfactants such as dispersing agents in concentrations of up to about 0.5 weight percent.

The wettable powders described above may also be used in the preparation of dusts. While such wettable powders could be used directly in dust form, it is more advantageous to dilute them by blending with the dense dust diluent. In this matter, dispersing agents, corrosion inhibitors and anti-foam agents can also be found as components of a dust.

Thus, the dust compositions used in this invention will comprise about 5 to 20 weight percent active material, up to 50 weight percent absorptive filler, 0 to 1.0 weight percent wetting agent, and about 29 to 95 weight percent dense, free-flowing dust diluent, as these terms are used herein. Such dust formulations can also contain pigments or minor amounts of dispersants, corrosion inhibitors and anti-foam agents.

Emulsifiable oils are usually solutions of active material in non-water miscible solvents together with a surfactant. Suitable solvents for the compounds of Formula II are chlorinated and aromatic hydrocarbons (substituted or unsubstituted), and non-water miscible alcohols, esters or ketones. Suitable surfactants are those anionic and non-toxic agents known to the art as emulsifying agents. Such compounds can be found listed by John W. McCutcheon in "Detergents and Emulsifiers, 1966 Annual."

Emulsifying agents most suitable for the compositions used in this invention are alkyl and alkylaryl polyester alcohols, condensation products of ethylene oxides with long chain mercaptans, glycerides, polyoxyethylene sorbitol or sorbitan fatty acid esters, polyethylene glycol fatty esters, fatty alkylol amide condensates, amine salts of fatty alcohol sulfates plus long chain alcohols and oil soluble petroleum sulfonates. Such emulsifying agents will comprise about three to ten weight percent of the total composition. As described above, however, up to five parts of emulsifying agent for each part of active compound can be used to give synergistic results.

Thus, emulsifiable oil compositions used in the present invention will consist of about 10 to 50 weight percent active material, about 40 to 88 weight percent solvent and about 2 to 10 weight percent emulsifier, as these terms are defined and used above. High-strength compositions will contain 90 to 99.5 weight percent active material together with 0.5 to 10 weight percent surfactant and 0 to 9.5 weight percent of an anti-caking agent.

The compounds used in this invention can also be formulated into granules and pellets. In such compositions the diluent will generally range from 65 to 99% and the active ingredient from 1 to 35%. An active ingredient content of from 1 to 6% is preferred. To prepare granules the active ingredient can be dissolved in a solvent, and this solution can be sprayed over pre-formed clay granules such as expanded Vermiculite or the like to distribute the active ingredient over and throughout the granular mass. Such granules usually range in particle size from about 0.25 to about 0.5 millimeter in diameter. It is also possible to make granules by mixing a finely divided diluent such as attapulgite, bentonite or kaolinite with the finely divided active ingredient, for instance by grinding them together, and then forming granules by adding water, tumbling the wetted mixture and drying the resulting spheres. Such materials will contain from 1 to 35% active ingredient. Pellets can also be prepared by extruding a mixture that comprises the active ingredient, pelleting clay diluent and water into strands, cutting these, and drying the product. The dried pellets can also be crushed into smaller granules if desired. Pellet size can range from two millimeters in diameter to larger shapes such as eight millimeter cubes. Pellets preferably contain from 5 to 35% of the active ingredient. In addition to the diluents, pelletized and granular compositions can contain additives such as binders, surfactants and the like.

In order that the methods of this invention can be more easily understood, the following additional illustrative examples are provided. All parts and percentages are by weight unless otherwise indicated.

EXAMPLE 1

Wettable powder: Percent
2,3,4,5-tetrahydro-6-methyl-[6H]-1,2,4-oxadiazine-3,5-dione _____ 50.0
Partially desulfonated sodium lignin sulfonate_ 1.0
Alkylnaphthalene sulfonic acid, sodium salt___ 2.0
Attapulgite clay _____ 47.0

The above ingredients are blended, then micropulverized until substantially all particles are less than 50 microns in diameter and finally reblended to homogeneity.

Two kilograms of the resulting wettable powder suspended in 300 liters of water are sprayed onto a one-hectare plot within a field of syrup sorghum approximately five weeks before harvest and before the sorghum has headed. At harvest, the treated plot yields significantly more raw syrup than other untreated one-hectare plots in the same field and it is observed that substantially less heading of the sorghum occurs in the treated plot than in the remainder of the field.

EXAMPLES 2 and 3

The following compounds are substituted individually in a like percent by weight for the 2,3,4,5-tetrahydro-4,6-dimethyl-[6H]-1,2,4-oxadiazine-3,5-dione in Example 1 and are formulated and applied in like manner with like results being obtained:

Examples: Compound
2_____ 2,3,4,5 - tetrahydro-[6H]-1,2,4-oxadiazine-3,5-dione.
3_____ 2,3,4,5-tetrahydro-2,6-dimethyl-[6H]-1,2,4-oxadiazine-3,5-dione.

EXAMPLE 4

Wettable powder: Percent
2,3,4,5 - tetrahydro-6-methyl-[6H]-1,2,4-oxadiazine-3,5-dione _____ 50.0
Sodium N-methyl-N-palmitoyl taurate_____ 2.0
Kaolin clay _____ 48.0

The above components are blended, micropulverized and then reblended as described in Example 1.

The resulting formulation is dispersed in water at a rate of 4 kilograms per 50 liters of water. Upon extension with water the active ingredient first disperses and then dissolves leaving the clay in suspension to act as a tracer indicating the efficiency of subsequent spraying operations. Using a sprayer-equipped airplane this dispersion is sprayed onto a sugar cane field at a rate of 50 liters per hectare approximately five weeks prior to harvest. Cane in the treated field ripens earlier and produces larger sucrose yields than does cane in untreated, neighboring fields.

EXAMPLE 5

2,3,4,5 - tetrahydro-[6H]-1,2,4-oxadiazine-3,5-dione is substituted in a like percent by weight for the 2,3,4,5-tetrahydro-6-methyl-[6H]-1,2,4-oxadiazine-3,5-dione in Example 4 and is formulated and applied in a like manner with like results being obtained.

EXAMPLE 6

High-surfactant powder: Percent
  2,3,4,5-tetrahydro - 2,6 - dimethyl-[6H]-1,2,4-
    oxadiazine-3,5-dione _____ 25.0
  Sodium lauryl sulfate_____ 55.0
  Synthetic fine silica_____ 20.0

The above ingredients are blended, micropulverized and reblended as described in Example 1.

Ten kilograms of the resulting wettable powder suspended in 400 liters of water are sprayed on one hectare of mixed vegetation containing crabgrass, pigweed and foxtail. Season-long control of these species is obtained.

EXAMPLES 7 and 8

The following compounds are substituted individually in a like percent by weight for the 2,3,4,5-tetrahydro-2,6-dimethyl-[6H]-1,2,4-oxadiazine-3,5-dione in Example 6 and are formulated and applied in a like manner with like results being obtained:

Examples: Compound
  7_____ 2,3,4,5 - tetrahydro-6-methyl-[6H] - 1,2,4-oxadiazine-3,5-dione.
  8_____ 2,3,4,5-tetrahydro-2-phenyl-6-methyl-[6H]-1,2,4-oxadiazine-3,5-dione.

EXAMPLE 9

Dust: Percent
  2,3,4,5-tetrahydro - 2,6 - dimethyl-[6H]-1,2,4-
    oxadiazine-3,5-dione _____ 10.0
  Diatomaceous silica _____ 5.0
  Micaceous talc _____ 85.0

The active ingredient is blended and ground with the diatomaceous silica until substantially all particles are less than 50 microns in diameter. The resulting powder is then blended with the micaceous talc to homogeneity.

The resulting dust is applied to a one-hectare plot within a sugar cane field four weeks before harvest at a rate of ten kilograms per hectare. Application is made in the early morning when the cane is covered by dew or just after the foilage is wetted during irrigation. The yield of sucrose from the treated plot is substantially greater than that from one-hectare plots within the untreated area of the field.

EXAMPLES 10 and 11

The following compounds are substituted individually in a like percent by weight for the 2,3,4,5-tetrahydro-2,6-dimethyl-[6H]-1,2,4-oxadiazine-3,5-dione in Example 9 and are formulated and applied in a like manner with like results being obtained:

Examples: Compound
  10_____2,3,4,5-tetrahydro-6-methyl - [6H] - 1,2,4-ozadiazine-3,5-dione
  11_____2,3,4,5-tetrahydro - 6 - methyl - 2 - hexyl-[6H]-1,2,4-ozadiazine-3,5-dione

EXAMPLE 12

Aqueous solution: Percent
  2,3,4,5-tetrahydro - [6H] - 1,2,4 - oxadiazine-
    3,5-dione _____ 10.0
  Water _____ 90.0

The above ingredients are combined and warmed with stirring to form an aqueous solution of the active ingredient.

Twenty kilograms of this solution extended with 240 liters of water are applied to a one-hectare plot of sugar cane approximately four weeks before harvest. The yield of sugar from the treated plot is substantially greater than that from other one-hectare plots within the same field of cane.

Twenty kilograms of the above aqueous solution extended with 240 liters of water as described above, are sprayed onto a one-hectare plot containing a mixture of Kentucky bluegrass and alta fescue along a highway. The bluegrass and fescue in the treated plot grows less rapidly than that in untreated plots along the same highway and requires less mowing to maintain an attractive turf.

EXAMPLE 13

130 parts of 2,3,4,5-tetrahydro-6-methyl-[6H]-1,2,4-oxadiazine-3,5-dione are added to 400 parts of 10% aqueous sodium hydroxide, the mixture is stirred for five minutes and the water is removed by evaporation under vacuum. The residue is essentially pure 2,3,4,5-tetrahydro-6-methyl-[6H]-1,2,4-oxadiazine-3,5-dione, sodium salt. This salt is substituted in a like percent by weight for the 2,3,4,5-tetrahydro-[6H]-1,2,4-oxadiazine-3,5-dione in Example 12 and is formulated and applied in a like manner with like results being obtained.

EXAMPLE 14

Wettable powder: Percent
  2,3,4,5-tetrahydro-2-isopropyl-6-methyl - [6H]-
    1,2,4-oxadiazine-3,5-dione _____ 80.0
  Montmorillonite clay _____ 16.0
  Dioctyl sodium sulfosuccinate _____ 1.0
  Calcium magnesium lignin sulfonate _____ 3.0

These four ingredients are blended, micropulverized and then reblended as described in Example 1.

The resulting wettable powder is suspended in water at a rate of which provides one kilogram of active ingredient per 300 liters of water. To the resulting suspension is added 0.2 percent by volume of a non-phytotoxic wetting agent. This suspension is sprayed onto a one-hectare plot of tobacco just before the heads emerge at a rate which provides one kilogram of active ingredient per hectare. The incidence of flowers and seed heads on the tobacco plants in the treated plot is substantially less than on tobacco plants in the untreated portions of the same field. The treated plot also produces a higher yield of high quality tobacco than do similar plots within untreated areas of the same field.

EXAMPLE 15

Wettable powder: Percent
  2,3,4,5-tetrahydro - 6 - methyl - [6H] - 1,2,4-
    oxadiazine-3,5-dione _____ 30.0
  Calcium magnesium lignin sulfonate plus wood
    sugars _____ 15.0
  Hydrated attapulgite _____ 2.0
  Dioctyl sodium sulfosuccinate _____ 1.0
  Water _____ 52.0

All these ingredients except the water are ground until they pass through a 0.40 mm. screen. The water is then added and the resulting mixture is sand-ground to a particle size below five microns.

The resulting formulation is suspended in water at a rate which provides two kilograms of the active ingredient per 100 liters of water. One hundred liters of the resulting suspension are applied to a one-hectare plot of sugar cane using a helicopter-mounted sprayer. The application is conducted thirty days prior to harvest of cane growing under climatic conditions which are not conducive to ripening. At harvest, the treated plot yields more sugar than one-hectare plots in the untreated portion of the field.

EXAMPLE 16

| Emulsifiable concentrate: | Percent |
|---|---|
| 2,3,4,5-tetrahydro - 2,6-methyl - [6H] - 1,2,4-oxadiazine-3,5-dione | 20.0 |
| Alkyl phenol polyglycol ether | 40.0 |
| Isophorone | 40.0 |

The above ingredients are combined and warmed with stirring until a homogeneous solution is obtained.

Thirty kilograms of this emulsifiable concentrate is emulsified in 200 liters of water and sprayed onto a one-hectare plot of sugar cane two weeks prior to anticipated harvest. Cane in the treated plot ripens more rapidly and uniformly than does cane in the untreated portions of the same field and the treated cane provides an excellent yield of sugar.

EXAMPLE 17

| Wettable power concentrate: | Percent |
|---|---|
| 2,3,4,5-tetrahydro - 6 - dimethyl - 2 - phenyl-[6H]-1,2,4-oxadiazine-3,5-dione | 95.0 |
| Trimethyl nonyl polyethylene glycol ether | 1.0 |
| Synthetic silica | 4.0 |

The above ingredients are blended, then micropulverized until all particles pass through a 0.25 mm. screen and finally reblended to homogeneity.

Two kilograms of the resulting wettable powder are suspended in 200 liters of water and applied to a one-hectare plot within a syrup sorghum field thirty days before harvest. The development of inflorescence in the treated plot is less than in untreated portions of the same field.

EXAMPLE 18

| Wettable powder: | Percent |
|---|---|
| 2,3,4,5-Tetrahydro-2-ethyl-6-methyl-[6H]-1,2,4-oxadiazine-3,5-dione | 25.0 |
| Synthetic silica | 10.0 |
| Attapulgite clay | 62.5 |
| Sodium alkyl naphthalene sulfonate | 2.0 |
| Methyl cellulose | 0.5 |

These ingredients are blended, then micropulverized until all particles pass through a 0.25 mm. screen and finally reblended to homogeneity.

Eight kilograms of the above formulation are suspended in 300 liters of water. To the resulting suspension is added 0.5 percent by weight of a non-phytotoxic surface active agent, "Triton" B-1956, a modified phthalic glycerol alkyd resin. The resulting suspension is sprayed onto a one-hectare plot within a sorghum field just prior to emergence of the head from the boot. In the treated plot, development of heads is less than and the syrup yield is greater than in untreated one-hectare plote within the same field.

EXAMPLES 19-26

The following compounds are substituted individually in a like percent by weight for the 2,3,4,5-tetrahydro-2-ethyl-6-methyl-[6H]-1,2,4-oxadiazine-3,5-dione in Example 18 and are formulated and applied in a like manner with like results being obtained:

| Examples: | Compound |
|---|---|
| 19 | 2,3,4,5-tetrahydro-2-phenyl-6-methyl-[6H]-1,2,3,4-oxadiazine-3,5-dione. |
| 21 | 2,3,4,5-tetrahydro-2-hexyl-6-methyl-[6H]-1,2,3,4-oxadiazine-3,5-dione. |
| 22 | 2,3,4,5-tetrahydro-2-amyl-6-methyl-[6H]-1,2,3,4-oxadiazine-3,5-dione. |
| 23 | 2,3,4,5-tetrahydro-2-hexyl-[6H]-1,2,3,4-oxadiazine-3,5-dione. |
| 24 | 2,3,4,5,-tetrahydro-2-phenyl-[6H]-1,2,3,4-oxadiazine-3,5-dione. |
| 25 | 2,3,4,5-tetrahydro-2-isopropyl-[6H]-1,2,3,4-oxadiazine-3,5-dione. |
| 26 | 2,3,4,5-tetrahydro-2-propyl-[6H]-1,2,3,4-oxadiazine-3,5-dione. |

EXAMPLE 27

| Emulsifiable liquid: | Percent |
|---|---|
| 2,3,4,5-tetrahydro-2-sec.-butyl-6-methyl-[6H]-1,2,4-oxadiazine-3,5-dione | 25.0 |
| Xylene | 30.0 |
| Isophorone | 35.0 |
| Oil-soluble petroleum sulfonate | 5.0 |
| Alkyl aryl polyglycol ether | 5.0 |

The above ingredients are combined and then warmed with stirring until homogeneous.

Eight kilograms of this formulation emulsified in 200 liters of water are sprayed onto a one-hectare plot of rapidly growing sugar cane thirty days prior to the planned harvest. Sucrose yields from the treated plot are greater than from untreated one-hectare plots from the same field.

EXAMPLE 28

| Granules: | Percent |
|---|---|
| 2,3,4,5-tetrahydro-6-methyl-[6H]-1,2,4-oxadiazine-3,5-dione | 5.0 |
| Partially hydrated attapulgite | 95.0 |

The above ingredients are blended and ground in a hammer mill. The resulting mixture is moistened with water and granulated by tumbling, and the granules are then dried.

Twenty kilograms of these granules are spread pre-emergence over a one-hectare plot within a corn field using an applicator pulled behind the corn planter. This treatment provides control of weeds such as barnyard grass, foxtail, crabgrass and pigweed.

What is claimed is:

1. A method for selectively regulating the growth of plants comprising applying to the locus of growth of said plants an effective amount of a compound of the formula

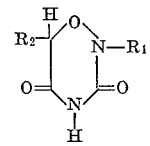

wherein $R_1$ is hydrogen, alkyl of 1 through 6 carbon atoms or phenyl and $R_2$ is hydrogen or methyl.

2. The method of claim 1 wherein said amount is sufficient to retard the growth of said plants.

3. The method of claim 1 wherein said amount is a herbicidal amount.

4. The method of claim 1 wherein said amount is sufficient to retard inflorescence of said plants.

5. The method of claim 1 wherein said compound is applied to said plants.

6. The method of claim 1 wherein said compound is applied to soil.

7. The method of claim 1 wherein $R_1$ is hydrogen or alkyl of 1 through 4 carbon atoms and $R_2$ is methyl.

8. The method of claim 1 wherein said compound is 2,3,4,5 - tetrahydro - 6 - methyl - [6H] - 1,2,4-oxadiazine-3,5-dione.

9. The method of claim 1 wherein said compound is 2,3,4,5 - tetrahydro - 2,6 - dimethyl - [6H] - 1,2,4-oxadiazine-3,5-dione.

10. The method of claim 1 wherein said compound is 2,3,4,5 - tetrahydro - 2 - ethyl - 6 - methyl - [6H] - 1,2,4-oxadiazine-3,5-dione.

11. The method of claim 1 wherein said compound is 2,3,4,5 - tetrahydro - 2 - propyl - 6 - methyl - [6H] - 1,2,4-oxadiazine-3,5-dione.

12. A method for increasing the sugar content of sugar cane and sorghum comprising applying to the locus of growth thereof from about 10 to about 60 days prior to normal harvest an effective amount of a compound of the formula

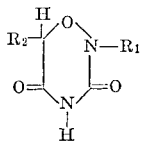

wherein $R_1$ is hydrogen, alkyl of 1 through 6 carbon atoms or phenyl, and $R_2$ is hydrogen or methyl.

13. The method of claim 12 wherein said compound is applied from about 20 to about 40 days prior to normal harvest.

14. The method of claim 12 wherein said compound is 2,3,4,5 - tetrahydro - 6 - methyl - [6H] - 1,2,4 - oxadiazine-3,5-dione.

15. The method of claim 12 wherein said compound is 2,3,4,5 - tetrahydro - 2,6 - dimethyl - [6H] - 1,2,4,oxadiazine-3,5-dione.

16. The method of claim 12 wherein said compound is 2,3,4,5 - tetrahydro - 2 - ethyl - 6 - methyl - [6H] - 1,2,4-oxadiazine-3,5-dione.

17. The method of claim 12 wherein said compound is 2,3,4,5 - tetrahydro - 2 - propyl - 6 - methyl - [6H] - 1,2,4-oxadiazine-3,5-dione.

References Cited

UNITED STATES PATENTS

| | | | |
|---|---|---|---|
| 3,282,987 | 11/1966 | Ellis | 71—106 |
| 3,437,664 | 4/1969 | Krenzer | 71—92 X |

FOREIGN PATENTS

| | | |
|---|---|---|
| 1,432,738 | 2/1966 | France. |
| 1,530,030 | 5/1968 | France. |

U.S. Cl. X.R.

71—76, 78; 260—244